United States Patent
Karasawa (10) Patent No.: US 8,670,177 B2
(45) Date of Patent: Mar. 11, 2014

(54) MULTIFUNCTIONAL POLARIZING FILTER AND METHOD FOR MANUFACTURING THE SAME

(75) Inventor: Yutaka Karasawa, Nagano (JP)

(73) Assignee: Marumi Optical Co., Ltd., Tokyo (JP)

(*) Notice: Subject to any disclaimer, the term of this patent is extended or adjusted under 35 U.S.C. 154(b) by 0 days.

(21) Appl. No.: 13/700,537

(22) PCT Filed: Aug. 12, 2010

(86) PCT No.: PCT/JP2010/064122
§ 371 (c)(1),
(2), (4) Date: Nov. 28, 2012

(87) PCT Pub. No.: WO2012/001823
PCT Pub. Date: Jan. 5, 2012

(65) Prior Publication Data
US 2013/0077156 A1    Mar. 28, 2013

(30) Foreign Application Priority Data
Jun. 30, 2010    (JP) ................... 2010-162247

(51) Int. Cl.
*G02B 5/30*    (2006.01)
(52) U.S. Cl.
USPC .................................... 359/352; 359/361
(58) Field of Classification Search
None
See application file for complete search history.

(56) References Cited

U.S. PATENT DOCUMENTS

| | | | | |
|---|---|---|---|---|
| 3,806,462 | A | * | 4/1974 | Bloom ................. 252/587 |
| 4,071,912 | A | * | 2/1978 | Budmiger ............. 2/8.8 |
| 4,155,122 | A | * | 5/1979 | Budmiger ............. 2/8.7 |
| 5,268,788 | A | * | 12/1993 | Fox et al. ........... 359/487.04 |
| 5,400,175 | A | * | 3/1995 | Johansen et al. ...... 359/361 |
| 6,887,531 | B2 | * | 5/2005 | Hones ............... 428/1.1 |
| 2012/0057240 | A1 | * | 3/2012 | Sundell ............. 359/601 |

FOREIGN PATENT DOCUMENTS

| | | |
|---|---|---|
| JP | 09-160092 | 6/1997 |
| JP | 2002-131535 | 5/2002 |
| JP | 2004-133155 | 4/2004 |
| JP | 2005-148224 | 6/2005 |
| WO | WO 98/58290 | 12/1998 |

OTHER PUBLICATIONS

International Search Report of PCT/JP2010/064122 (2 pages).

* cited by examiner

*Primary Examiner* — Arnel C Lavarias
(74) *Attorney, Agent, or Firm* — Flynn, Thiel, Boutell & Tanis, P.C.

(57) ABSTRACT

A multifunctional polarizing filter is used for a digital camera, and is produced by advanced optical technology to have a very small thickness and an integral structure in order to prevent a vignetting phenomenon in which the captured image is adversely affected by the frame of the filter.

4 Claims, 4 Drawing Sheets

MULTIFUNCTIONAL POLARIZING FILTER AND METHOD FOR MANUFACTURING THE SAME

TECHNICAL FIELD

The invention relates to a multifunctional polarizing filter that is attached to the front side of the lens of a digital camera that is used for testing equipment, measuring equipment, medical equipment, or the like, and required to capture a very clear image, and a method for producing the multifunctional polarizing filter.

In particular, the invention may provide a filter that functions as a polarizing filter and an ultraviolet cut filter that can efficiently reflect (or absorb) ultraviolet rays, a filter that functions as a polarizing filter and a near-infrared cut filter that can reflect near-infrared rays, and a filter that functions as a polarizing filter and an ultraviolet/near-infrared cut filter that can block ultraviolet rays and near-infrared rays.

BACKGROUND ART

In recent years, a polarizing filter that is attached to the front side of the lens of a digital camera that is used for testing equipment, measuring equipment, medical equipment, or the like, and required to capture a very clear image, has been desired to function as an ultraviolet cut filter, a near-infrared cut filter, or an ultraviolet/near-infrared cut filter.

A technique that attaches a linear polarizing filter or a circular polarizing filter to the front side of the lens of a digital camera in combination with an ultraviolet cut filter, a near-infrared cut filter, or an ultraviolet/near-infrared cut filter has been normally used to deal with such a demand.

More specifically, a polarizing filter and an ultraviolet cut filter are attached to the front side of the lens of a digital camera when it is desired to obtain a filter that functions as a polarizing filter and an ultraviolet cut filter that can reflect (or absorb) ultraviolet rays.

A polarizing filter and a near-infrared cut filter are attached to the front side of the lens of a digital camera when it is desired to obtain a filter that functions as a polarizing filter and a near-infrared cut filter that can reflect near-infrared rays.

A polarizing filter, an ultraviolet cut filter, and a near-infrared cut filter (or a polarizing filter and an ultraviolet/near-infrared cut filter) are attached to the front side of the lens of a digital camera when it is desired to obtain a filter that functions as a polarizing filter and an ultraviolet/near-infrared cut filter.

However, since the total thickness of the filters considerably increases when a plurality of filters that differ in function are merely attached to the front side of a digital camera (e.g., digital single-lens reflex camera) in order to obtain a filter that functions as a polarizing filter and an ultraviolet cut filter, a filter that functions as a polarizing filter and a near-infrared cut filter, or a filter that functions as a polarizing filter and an ultraviolet/near-infrared cut filter, a vignetting phenomenon in which the captured image is adversely affected by the frame of the filter may occur. The vignetting phenomenon is particularly undesirable in the medical fields and the like for which a very clear and accurate image is required.

Therefore, development of a multifunctional polarizing filter that has a thickness almost equal to (desirably smaller than) that of a linear polarizing filter and a circular polarizing filter (hereinafter collectively referred to as "polarizing filter") has been strongly desired.

SUMMARY OF THE INVENTION

The invention relates to a multifunctional polarizing filter that is attached to the front side of the lens of a digital camera that is used for testing equipment, measuring equipment, medical equipment, or the like, and required to capture a very clear image, and a method for producing the multifunctional polarizing filter.

The invention may implement a filter that functions as a polarizing filter and an ultraviolet cut filter that can efficiently reflect (or absorb) ultraviolet rays.

The invention may implement a filter that functions as a polarizing filter and a near-infrared cut filter that can reflect near-infrared rays.

The invention may also implement a filter that functions as a polarizing filter and an ultraviolet/near-infrared cut filter that can block ultraviolet rays and near-infrared rays.

A related-art technique implements a filter that functions as a polarizing filter and an ultraviolet cut filter, a filter that functions as a polarizing filter and a near-infrared cut filter, or a filter that functions as a polarizing filter and an ultraviolet/near-infrared cut filter by merely attaching a plurality of filters that differ in function to the front side of a digital camera. In this case, however, the total thickness of the filters considerably increases, so that a vignetting phenomenon in which the captured image is adversely affected by the frame of the filter may occur (i.e., the entire captured image may become dark).

An object of the invention is to provide a multifunctional polarizing filter that is produced by advanced optical technology to have a very small thickness and an integral structure in order to prevent a vignetting phenomenon in which the captured image is adversely affected by the frame of the filter.

It has been very difficult to produce a multifunctional polarizing filter that has a very small thickness and an integral structure. Specifically, a polarizing film that forms a polarizing filter is formed of a very thin parallelly-oriented organic substance (polyvinyl alcohol) that is colored with an iodine-containing dye. The polarizing film is easily affected by ultraviolet rays and infrared rays, and exhibits poor heat resistance.

An ultraviolet cut filter or a near-infrared cut filter that may be integrated with a polarizing filter is formed of a dielectric multilayer film that is formed by stacking several tens of thin films that differ in refractive index on a glass substrate. The dielectric multilayer film is formed by applying electron-beam evaporation, high-frequency evaporation, laser-beam evaporation, ionized sputtering, ion-beam sputtering, or plasma sputtering, for example. Since the dielectric multilayer film-forming process requires a high-temperature vacuum environment, the polarizing film may easily be adversely affected (e.g., thermal deterioration or warping may occur). Attempts have been made to perform evaporation or sputtering in a low-temperature environment. However, since evaporation or sputtering takes time in a low-temperature environment, it is difficult to implement mass production.

Specifically, since the polarizing filter production process is incompatible with the ultraviolet cut filter/near-infrared cut filter production process that includes the dielectric multilayer film-forming process, it has been impossible to industrially produce a multifunctional polarizing filter.

According to one aspect of the invention, a multifunctional polarizing filter that is attached to a front side of a lens of a digital camera that is used for testing equipment, measuring equipment, medical equipment, or the like, and functions as a polarizing filter and an ultraviolet cut filter, includes a main body that includes an ultraviolet cut glass substrate that is positioned on a light-incident side, and a transmitting glass substrate that is positioned on a camera side, a surface of the ultraviolet cut glass substrate positioned on the light-incident side being polished, and coated with an antireflection coating (note: the surface of the ultraviolet cut glass substrate may be polished and coated with the antireflection coating in an arbitrary step, but is normally polished and coated with the antireflection coating after bonding the ultraviolet cut glass substrate and the transmitting glass substrate (i.e., in the final production step) (hereinafter the same)), an ultraviolet cut thin film formed of a dielectric multilayer film being stacked on a surface of the ultraviolet cut glass substrate positioned on the camera side, a polarizing filter being bonded to a surface of the transmitting glass substrate positioned on the light-incident side through an adhesive, a surface of the transmitting glass substrate positioned on the camera side being polished, and coated with an antireflection coating, and the ultraviolet cut glass substrate and the transmitting glass substrate being integrated through an adhesive.

According to another aspect of the invention, a multifunctional polarizing filter that is attached to a front side of a lens of a digital camera that is used for testing equipment, measuring equipment, medical equipment, or the like, and functions as a polarizing filter and a near-infrared cut filter, includes a main body that includes a near-infrared cut glass substrate that is positioned on a light-incident side, and a transmitting glass substrate that is positioned on a camera side, a surface of the near-infrared cut glass substrate positioned on the light-incident side being polished, and coated with an antireflection coating, a near-infrared cut thin film formed of a dielectric multilayer film being stacked on a surface of the near-infrared cut glass substrate positioned on the camera side, a polarizing filter being bonded to a surface of the transmitting glass substrate positioned on the light-incident side through an adhesive, a surface of the transmitting glass substrate positioned on the camera side being polished, and coated with an antireflection coating, and the near-infrared cut glass substrate and the transmitting glass substrate being integrated through an adhesive.

According to another aspect of the invention, a multifunctional polarizing filter that is attached to a front side of a lens of a digital camera that is used for testing equipment, measuring equipment, medical equipment, or the like, and functions as a polarizing filter and an ultraviolet/near-infrared cut filter, includes a main body that includes an ultraviolet/near-infrared cut glass substrate that is positioned on a light-incident side, and a transmitting glass substrate that is positioned on a camera side, a surface of the ultraviolet/near-infrared cut glass substrate positioned on the light-incident side being polished, and coated with an antireflection coating, an ultraviolet/near-infrared cut thin film formed of a dielectric multilayer film being stacked on a surface of the ultraviolet/near-infrared cut glass substrate positioned on the camera side, a polarizing filter being bonded to a surface of the transmitting glass substrate positioned on the light-incident side through an adhesive, a surface of the transmitting glass substrate positioned on the camera side being polished, and coated with an antireflection coating, and the ultraviolet/near-infrared cut glass substrate and the transmitting glass substrate being integrated through an adhesive.

According to another aspect of the invention, a method for producing the multifunctional polarizing filter includes separately producing a glass substrate that is positioned on a light-incident side, and a transmitting glass substrate that is positioned on a camera side; stacking a dielectric multilayer film that blocks ultraviolet rays, or blocks near-infrared rays, or blocks ultraviolet rays and near-infrared rays on a surface of the glass substrate positioned on the camera side by a high-temperature process such as sputtering or vacuum evaporation to obtain an ultraviolet cut filter, a near-infrared cut filter, or an ultraviolet/near-infrared cut filter; bonding a polarizing filter to a surface of the transmitting glass substrate positioned on the light-incident side through an adhesive; integrating the glass substrate and the transmitting glass substrate through an adhesive to obtain a multifunctional polarizing filter; and polishing each side of the multifunctional polarizing filter, and coating each side of the multifunctional polarizing filter with an antireflection coating (note: the polishing/coating step is performed in the final stage from the viewpoint of ease of operation and mass production).

According to the invention makes it possible to it is possible to produce a multifunctional polarizing filter that has a very small thickness and an integral structure as compared with the related-art production method by employing the above filter configuration and production method. The invention thus solves the following technical problem that has been difficult to solve.

Specifically, a polarizing film that forms a polarizing filter is formed of a very thin parallelly-oriented organic substance (polyvinyl alcohol) that is colored with an iodine-containing dye. The polarizing film is easily affected by ultraviolet rays and infrared rays, and exhibits poor heat resistance.

An ultraviolet cut filter or a near-infrared cut filter that is integrated with the polarizing filter is formed of a dielectric multilayer film that is formed by stacking several tens of thin films that differ in refractive index on a glass substrate. The dielectric multilayer film is formed by applying electron-beam evaporation, high-frequency evaporation, laser-beam evaporation, ionized sputtering, ion-beam sputtering, or plasma sputtering, for example. Since the dielectric multilayer film-forming process requires a high-temperature vacuum environment, attempts have been made to perform evaporation or sputtering in a low-temperature environment. However, since evaporation or sputtering takes time in a low-temperature environment, it is difficult to implement mass production. The invention can solve this technical problem.

The method for producing a multifunctional polarizing filter according to the aspect of the invention includes separately producing the glass substrate that is positioned on the light-incident side, and the transmitting glass substrate that is positioned on the camera side, stacking the dielectric multilayer film on the surface of the glass substrate positioned on the camera side by a high-temperature process such as sputtering or vacuum evaporation, bonding the polarizing filter to the transmitting glass substrate through an adhesive, and integrating the glass substrate and the transmitting glass substrate through an adhesive.

A multifunctional polarizing filter produced by the above production method has a very small thickness and an integral structure, and can completely prevent a vignetting phenomenon in which the captured image is adversely affected by the frame of the filter.

DESCRIPTION OF EMBODIMENTS

Several embodiments of the invention may provide a filter that functions as a polarizing filter and an ultraviolet cut filter that can efficiently reflect (or absorb) ultraviolet rays, a filter that functions as a polarizing filter and a near-infrared cut filter that can reflect near-infrared rays, and a filter that functions as a polarizing filter and an ultraviolet/near-infrared cut filter that can block ultraviolet rays and near-infrared rays.

An object of several embodiments of the invention is to provide a multifunctional polarizing filter that is used for a digital camera or the like, and produced by advanced optical technology to have a very small thickness and an integral structure in order to prevent a vignetting phenomenon in which the captured image is adversely affected by the frame of the filter.

It has been very difficult to produce a multifunctional polarizing filter that has a very small thickness and an integral structure. Specifically, a polarizing film that forms a polarizing filter is formed of a very thin parallelly-oriented organic substance (polyvinyl alcohol) that is colored with an iodine-containing dye. The polarizing film is easily affected by ultraviolet rays and infrared rays, and exhibits poor heat resistance.

An ultraviolet cut filter or a near-infrared cut filter that is integrated with the polarizing filter is formed of a dielectric multilayer film that is formed by stacking several tens of thin films that differ in refractive index on a glass substrate. The dielectric multilayer film is formed by applying electron-beam evaporation, high-frequency evaporation, laser-beam evaporation, ionized sputtering, ion-beam sputtering, or plasma sputtering, for example. Since the dielectric multilayer film-forming process requires a high-temperature vacuum environment, attempts have been made to perform evaporation or sputtering in a low-temperature environment. However, since evaporation or sputtering takes time in a low-temperature environment, it is difficult to implement mass production.

Therefore, since the polarizing filter production process is incompatible with the ultraviolet cut filter/near-infrared cut filter production process that includes the dielectric multilayer film-forming process, it has been difficult to produce a multifunctional polarizing filter.

A method for producing a multifunctional polarizing filter according to one embodiment of the invention includes separately producing a glass substrate that is positioned on the light-incident side, and a transmitting glass substrate that is positioned on the camera side, stacking a dielectric multilayer film on the surface of the glass substrate positioned on the camera side by a high-temperature process such as sputtering or vacuum evaporation, bonding a polarizing filter to the transmitting glass substrate through an adhesive, and integrating the glass substrate and the transmitting glass substrate through an adhesive.

This makes it possible to implement a mass production system that does not cause the polarizing film to thermally deteriorate during the process, for example.

A multifunctional polarizing filter produced by the above production method has a very small thickness and an integral structure, and can completely prevent a vignetting phenomenon in which the captured image is adversely affected by the frame of the filter.

First Embodiment

Figure 1:
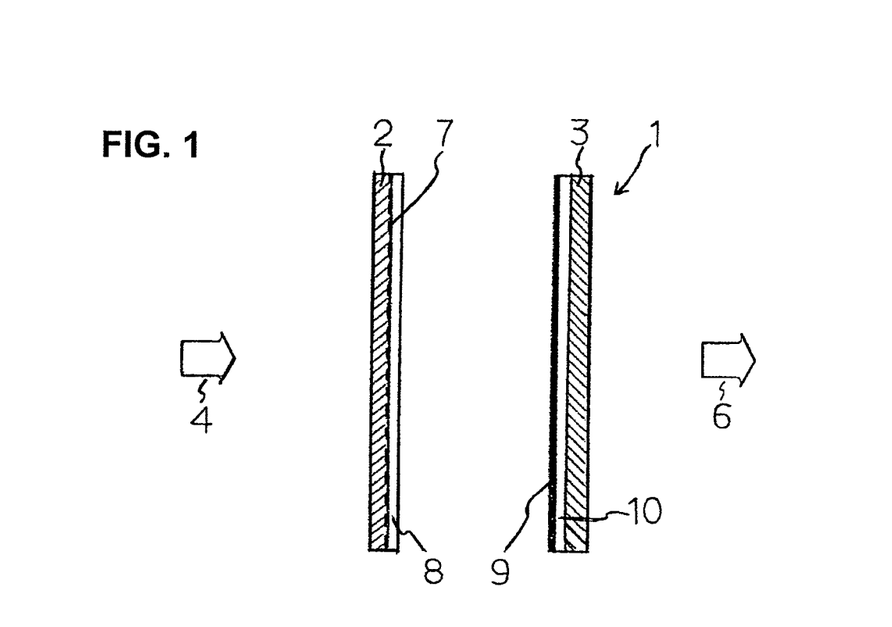
FIG. 1 illustrates a state in which an ultraviolet cut glass substrate and a transmitting glass substrate are separated (first embodiment).

A first embodiment of the invention is described below with reference to FIGS. 1 and 2. FIG. 1 illustrates a state in which an ultraviolet cut glass substrate and a transmitting glass substrate that holds a polarizing filter are separated, and FIG. 2 is a cross-sectional view illustrating a state in which the ultraviolet cut glass substrate illustrated in FIG. 1 is integrated with (bonded to) the transmitting glass substrate.

Figure 2:
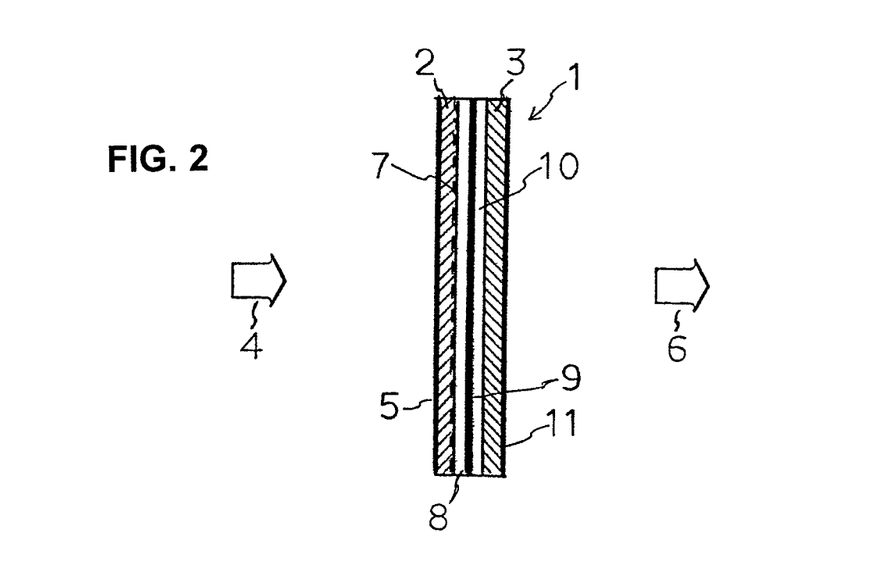
FIG. 2 illustrates a state in which an ultraviolet cut glass substrate and a transmitting glass substrate are integrated (first embodiment).

In FIGS. 1 and 2, reference sign 1 indicates a main body of a filter that functions as a polarizing filter and an ultraviolet cut filter, reference sign 2 indicates an ultraviolet cut glass substrate, and reference sign 3 indicates a transmitting glass substrate. The surface of the ultraviolet cut glass substrate 2 positioned on a light-incident side 4 is coated with an antireflection coating 5. An ultraviolet cut thin film 7 is stacked on the surface of the ultraviolet cut glass substrate 2 positioned on a camera side 6, and an adhesive 8 for bonding the ultraviolet cut glass substrate 2 and the transmitting glass substrate 3 is provided on the ultraviolet cut thin film 7.

A polarizing filter 9 is bonded to the surface of the transmitting glass substrate 3 positioned on the light-incident side 4 through an adhesive 10. The surface of the transmitting glass substrate 3 positioned on the camera side 6 is coated with an antireflection coating 11.

The filter according to the first embodiment that functions as a polarizing filter and an ultraviolet cut filter is attached to the front side of the lens of a digital camera, wherein the main body 1 of the filter includes the ultraviolet cut glass substrate 2 that is positioned on the light-incident side 4, and the transmitting glass substrate 3 that is positioned on the camera side 6, and the surface of the ultraviolet cut glass substrate 2 positioned on the light-incident side 4 is polished, and coated with the antireflection coating 5 in the subsequent step.

The ultraviolet cut thin film 7 formed of a dielectric multilayer film is stacked on the surface of the ultraviolet cut glass substrate 2 positioned on the camera side 6, and the polarizing filter 9 is bonded to the surface of the transmitting glass substrate 3 positioned on the light-incident side 4 through the adhesive 10. The surface of the transmitting glass substrate 3 positioned on the camera side 6 is polished, and coated with the antireflection coating 11. The ultraviolet cut glass substrate 2 and the transmitting glass substrate 3 are integrated (bonded) through the adhesive 8.

The first embodiment can thus solve the above difficult technical problem, and produce a multifunctional filter that functions as an ultraviolet cut filter (i.e., ultraviolet cut thin film 7) and a polarizing filter (i.e., polarizing filter 9), and has a very small thickness and an integral structure.

A polarizing film that forms the polarizing filter 9 is formed of a very thin parallelly-oriented organic substance (polyvinyl alcohol) that is colored with an iodine-containing dye. The polarizing film is easily affected by ultraviolet rays and infrared rays, and exhibits poor heat resistance.

The ultraviolet cut thin film 7 that is integrated with the polarizing filter 9 is formed of a dielectric multilayer film that is formed by stacking several tens of thin films that differ in refractive index on the ultraviolet cut glass substrate 2. The dielectric multilayer film is formed by applying electron-beam evaporation, high-frequency evaporation, laser-beam evaporation, ionized sputtering, ion-beam sputtering, or plasma sputtering, for example. Since the dielectric multilayer film-forming process requires a high-temperature vacuum environment, it is impossible to simultaneously form the dielectric multilayer and the polarizing filter. The method for producing a multifunctional filter according to the first embodiment can solve the above technical problem.

Specifically, the method for producing a multifunctional filter according to the first embodiment includes separately providing (producing) the ultraviolet cut glass substrate 2 that is positioned on the light-incident side 4, and the transmitting glass substrate 3 that is positioned on the camera side 6, stacking a dielectric multilayer film that blocks ultraviolet rays on the surface of the ultraviolet cut glass substrate 2 positioned on the camera side 6 by a high-temperature process (e.g., sputtering or vacuum evaporation) to obtain an ultraviolet cut filter, bonding the polarizing filter 9 to the surface of the transmitting glass substrate 3 positioned on the light-incident side 4 through the adhesive 10, integrating the ultraviolet cut glass substrate 2 and the transmitting glass substrate 3 through the adhesive 8 to obtain a multifunctional filter, polishing each side of the main body 1, and coating each side of the main body 1 with the antireflection coating 5 or 11.

It is thus possible to produce a multifunctional polarizing filter that has a very small thickness and an integral structure. Therefore, it is possible to completely prevent a vignetting phenomenon in which the captured image is adversely affected by the frame of the filter even when the filter is attached to the lens barrel of a digital camera.

Second Embodiment

Figure 3:
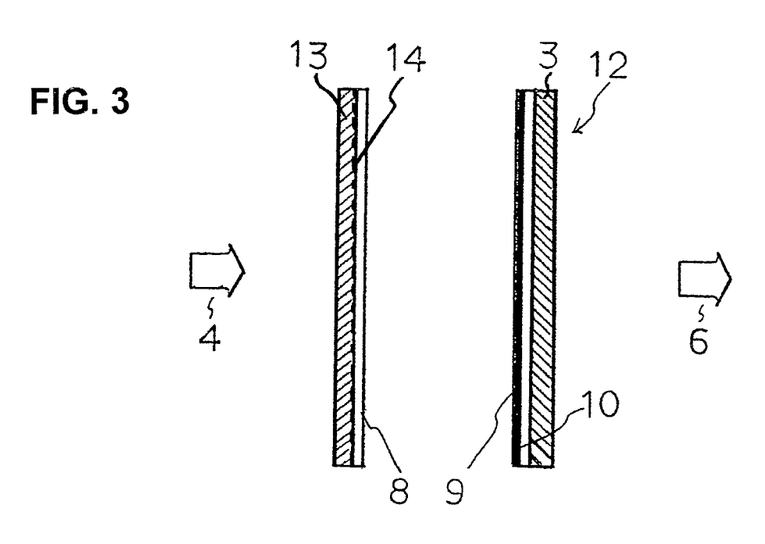
FIG. 3 illustrates a state in which a near-infrared cut glass substrate and a transmitting glass substrate are separated (second embodiment).

A second embodiment of the invention is described below with reference to FIGS. 3 and 4. FIG. 3 illustrates a state in which a near-infrared cut glass substrate and a transmitting glass substrate that holds a polarizing filter are separated, and FIG. 4 is a cross-sectional view illustrating a state in which the near-infrared cut glass substrate illustrated in FIG. 3 is integrated with (bonded to) the transmitting glass substrate.

Figure 4:
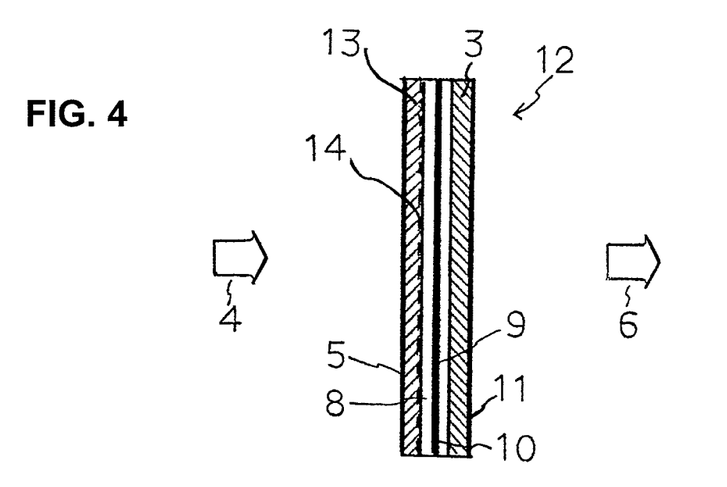
FIG. 4 illustrates a state in which a near-infrared cut glass substrate and a transmitting glass substrate are integrated (second embodiment).

In FIGS. 3 and 4, reference sign 12 indicates a main body of a filter that functions as a polarizing filter and a near-infrared cut filter, reference sign 13 indicates a near-infrared cut glass substrate, and reference sign 3 indicates a transmitting glass substrate. The surface of the near-infrared cut glass substrate 13 positioned on a light-incident side 4 is coated with an antireflection coating 5. A near-infrared cut thin film 14 is stacked on the surface of the near-infrared cut glass substrate 13 positioned on a camera side 6, and an adhesive 8 for bonding the near-infrared cut glass substrate 13 and the transmitting glass substrate 3 is provided on the near-infrared cut thin film 14.

A polarizing filter 9 is bonded to the surface of the transmitting glass substrate 3 positioned on the light-incident side 4 through an adhesive 10. The surface of the transmitting glass substrate 3 positioned on the camera side 6 is coated with an antireflection coating 11.

The filter according to the second embodiment that functions as a polarizing filter and a near-infrared cut filter is attached to the front side of the lens of a digital camera, wherein the main body 12 of the filter includes the near-infrared cut glass substrate 13 that is positioned on the light-incident side 4, and the transmitting glass substrate 3 that is positioned on the camera side 6, and the surface of the near-infrared cut glass substrate 13 positioned on the light-incident side 4 is polished, and coated with the antireflection coating 5 in the subsequent step.

The near-infrared cut thin film 7 that is integrated with the polarizing filter 9 is formed of a dielectric multilayer film that is formed by stacking several tens of thin films that differ in refractive index on the near-infrared cut glass substrate 13. The dielectric multilayer film is formed by applying electron-beam evaporation, high-frequency evaporation, laser-beam evaporation, ionized sputtering, ion-beam sputtering, or plasma sputtering, for example. Since the dielectric multilayer film-forming process requires a high-temperature vacuum environment, it is impossible to simultaneously form the dielectric multilayer and the polarizing filter that has poor heat resistance. The method for producing a multifunctional filter according to the second embodiment of the invention can solve the above technical problem A polarizing film that forms the polarizing filter 9 is formed of a very thin parallelly-oriented organic substance (polyvinyl alcohol) that is colored with an iodine-containing dye. The polarizing film is easily affected by ultraviolet rays and infrared rays, and exhibits poor heat resistance.

The near-infrared cut thin film 16 that is integrated with the polarizing filter 11 is formed of a dielectric multilayer film that is formed by stacking several tens of thin films that differ in refractive index on the near-infrared cut glass substrate 15. The dielectric multilayer film is formed by applying electron-beam evaporation, high-frequency evaporation, laser-beam evaporation, ionized sputtering, ion-beam sputtering, or plasma sputtering, for example. Since the dielectric multilayer film-forming process requires a high-temperature vacuum environment, it is impossible to simultaneously form the dielectric multilayer and the polarizing filter.

The method for producing a multifunctional filter according to the second embodiment of the invention includes separately providing (producing) the near-infrared cut glass substrate 13 that is positioned on the light-incident side 4, and the transmitting glass substrate 3 that is positioned on the camera side 6, stacking a dielectric multilayer film that blocks near-infrared rays on the surface of the near-infrared cut glass substrate 13 positioned on the camera side 6 by a high-temperature process (e.g., sputtering or vacuum evaporation) to obtain a near-infrared cut filter, bonding the polarizing filter 9 to the surface of the transmitting glass substrate 3 positioned on the light-incident side 4 through the adhesive 10, integrating the near-infrared cut glass substrate 13 and the transmitting glass substrate 3 through the adhesive 8 to obtain a multifunctional filter, polishing each side of the main body 12, and coating each side of the main body 12 with the antireflection coating 5 or 11.

It is thus possible to produce a multifunctional polarizing filter that has a very small thickness and an integral structure. Therefore, it is possible to completely prevent a vignetting phenomenon in which the captured image is adversely affected by the frame of the filter even when the filter is attached to the lens barrel of a digital camera. Moreover, the near-infrared cut thin film 14 provided on the front side of the polarizing filter 9 can protect the polarizing filter 9 that exhibits poor heat resistance, and can also protect a CCD or CMOS sensor provided in a digital single-lens reflex camera.

Third Embodiment

Figure 5:
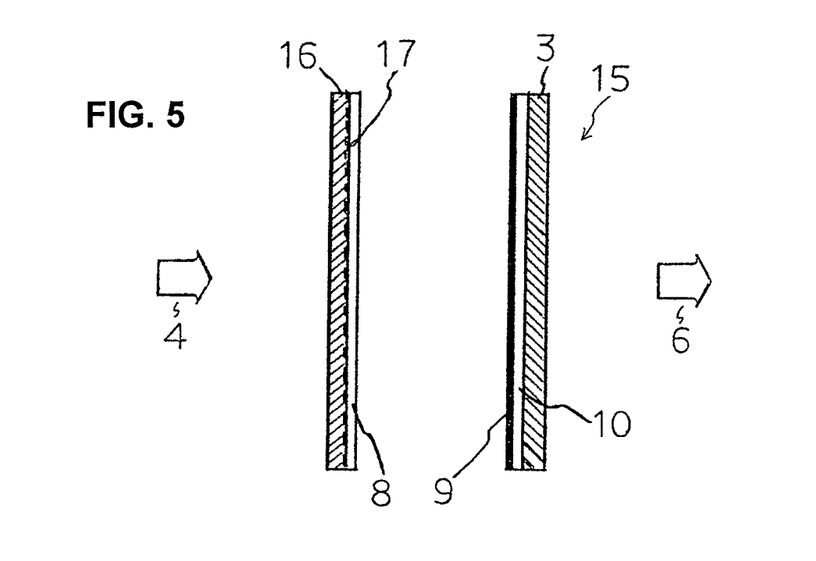
FIG. 5 illustrates a state in which an ultraviolet/near-infrared cut glass substrate and a transmitting glass substrate are separated (third embodiment).

A third embodiment of the invention is described below with reference to FIGS. 5 and 6. FIG. 5 illustrates a state in which an ultraviolet/near-infrared cut glass substrate and a transmitting glass substrate that holds a polarizing filter are separated, and FIG. 6 is a cross-sectional view illustrating a state in which the ultraviolet/near-infrared cut glass substrate illustrated in FIG. 5 is integrated with (bonded to) the transmitting glass substrate.

Figure 6:
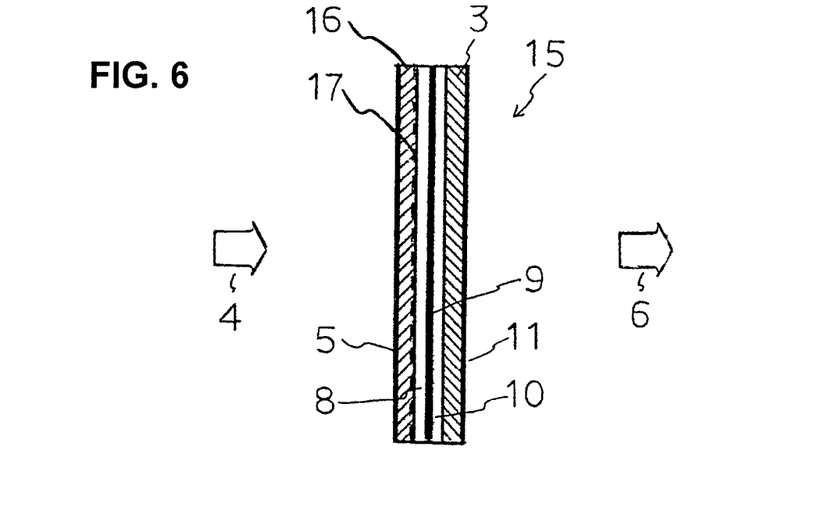
FIG. 6 illustrates a state in which an ultraviolet/near-infrared cut glass substrate and a transmitting glass substrate are integrated (third embodiment).

In FIGS. 5 and 6, reference sign 15 indicates a main body of a filter that functions as a polarizing filter and an ultraviolet/near-infrared cut filter, reference sign 16 indicates an ultraviolet/near-infrared cut filter glass substrate, and reference sign 3 indicates a transmitting glass substrate. The surface of the ultraviolet/near-infrared cut glass substrate 16 positioned on a light-incident side 4 is coated with an antireflection coating 5. An ultraviolet/near-infrared cut thin film 17 is stacked on the surface of the ultraviolet/near-infrared cut glass substrate 16 positioned on a camera side 6, and an adhesive 8 for bonding the ultraviolet/near-infrared cut glass substrate 16 and the transmitting glass substrate 3 is provided on the ultraviolet/near-infrared cut thin film 17.

A polarizing filter 9 is bonded to the surface of the transmitting glass substrate 3 positioned on the light-incident side 4 through an adhesive 10. The surface of the transmitting glass substrate 3 positioned on the camera side 6 is coated with an antireflection coating 11.

The filter according to the third embodiment that functions as a polarizing filter and an ultraviolet/near-infrared cut filter is attached to the front side of the lens of a digital camera, wherein the main body 15 of the filter includes the ultraviolet/near-infrared cut glass substrate 16 that is positioned on the light-incident side 4, and the transmitting glass substrate 3 that is positioned on the camera side 6, and the surface of the ultraviolet/near-infrared cut glass substrate 16 positioned on the light-incident side 4 is polished, and coated with the antireflection coating 5 (see FIG. 6).

The ultraviolet/near-infrared cut thin film 17 formed of a dielectric multilayer film is stacked on the surface of the ultraviolet/near-infrared cut glass substrate 16 positioned on the camera side 6, and the polarizing filter 9 is bonded to the surface of the transmitting glass substrate 3 positioned on the light-incident side 4 through the adhesive 10. The surface of the transmitting glass substrate 3 positioned on the camera side 6 is polished, and coated with the antireflection coating 11. The ultraviolet/near-infrared cut glass substrate 16 and the transmitting glass substrate 3 are integrated (bonded) through the adhesive 8.

The third embodiment can thus solve the above difficult technical problem, and produce a multifunctional filter that functions as an ultraviolet/near-infrared cut filter (i.e., ultraviolet/near-infrared cut thin film 17) and a polarizing filter (i.e., polarizing filter 9), and has a very small thickness and an integral structure.

A polarizing film that forms the polarizing filter 9 is formed of a very thin parallelly-oriented organic substance (polyvinyl alcohol) that is colored with an iodine-containing dye. The polarizing film is easily affected by ultraviolet rays and infrared rays, and exhibits poor heat resistance.

The ultraviolet/near-infrared cut thin film 17 that is integrated with the polarizing filter 9 is formed of a dielectric multilayer film that is formed by stacking several tens of thin films that differ in refractive index on the ultraviolet/near-infrared cut glass substrate 16. The dielectric multilayer film is formed by applying electron-beam evaporation, high-frequency evaporation, laser-beam evaporation, ionized sputtering, ion-beam sputtering, or plasma sputtering, for example. Since the dielectric multilayer film-forming process requires a high-temperature vacuum environment, it is impossible to simultaneously form the dielectric multilayer and the polarizing filter. Attempts have been made to perform evaporation or sputtering in a low-temperature environment. However, since evaporation or sputtering takes time in a low-temperature environment, a decrease in productivity may occur.

The method for producing a multifunctional filter according to the third embodiment of the invention includes separately providing the ultraviolet/near-infrared cut glass substrate 16 that is positioned on the light-incident side 4, and the transmitting glass substrate 3 that is positioned on the camera side 6, stacking a dielectric multilayer film that blocks ultraviolet rays and near-infrared rays on the surface of the ultraviolet/near-infrared cut glass substrate 16 positioned on the camera side 6 by a high-temperature process (e.g., sputtering or vacuum evaporation) to obtain an ultraviolet/near-infrared cut filter, bonding the polarizing filter 9 to the surface of the transmitting glass substrate 3 positioned on the light-incident side 4 through the adhesive 10, integrating the ultraviolet/near-infrared cut glass substrate 16 and the transmitting glass substrate 3 through the adhesive 8 to obtain a multifunctional filter, polishing each side of the multifunctional filter, and coating each side of the multifunctional filter with the antireflection coating 5 or 11.

Figure 7:
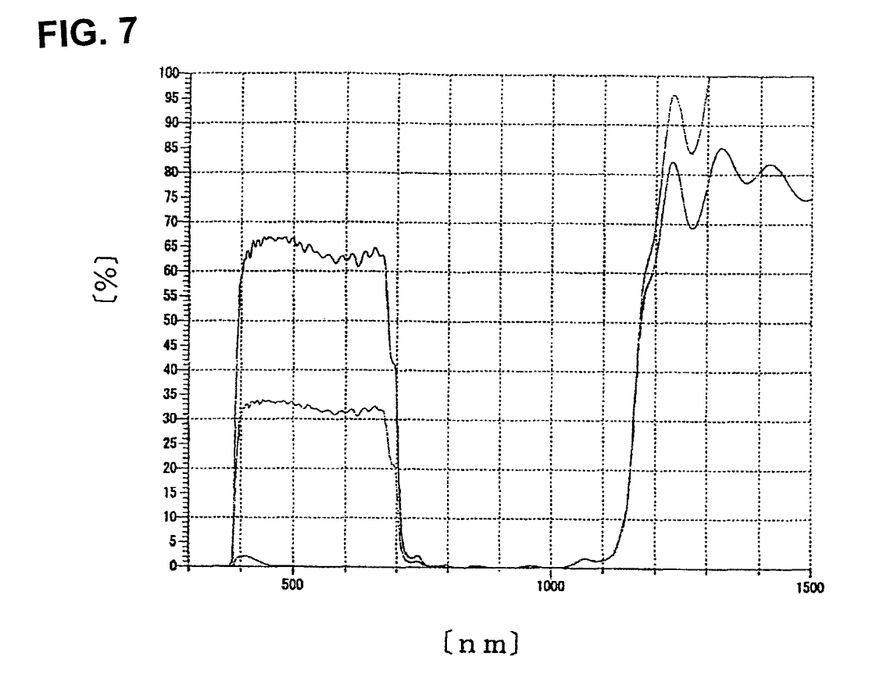
FIG. 7 is a view illustrating the relationship between the transmittance and the wavelength measured using an ultraviolet/near-infrared cut filter and a polarizing filter (third embodiment).

FIG. 7 illustrates the transmittance distribution of the multifunctional polarizing filter according to the third embodiment that functions as a polarizing filter and an ultraviolet/near-infrared cut filter. As illustrated in FIG. 7, the polarizing filter according to the third embodiment had a very small ripple and a high transmittance in the visible region, although the multifunctional polarizing filter includes three types of filters.

Therefore, a clear captured image can be obtained using a multifunctional polarizing filter produced by the above method, although the polarizing filter includes three types of filters. Moreover, since the thickness of the multifunctional polarizing filter can be significantly reduced, it is possible to completely prevent a vignetting phenomenon in which the captured image is adversely affected by the frame of the filter due to a small thickness even when the multifunctional polarizing filter is attached to the lens barrel of a camera when used for medical equipment, measuring equipment, testing equipment, or the like that utilizes a digital single-lens reflex camera, a digital video camera, or a digital camera.

INDUSTRIAL APPLICABILITY

The embodiments of the invention thus provide a multifunctional polarizing filter that is used for a digital camera or the like, and produced by advanced optical technology to have a very small thickness and an integral structure in order to prevent a vignetting phenomenon in which the captured image is adversely affected by the frame of the filter. The multifunctional polarizing filter may widely be used for medical equipment, measuring equipment, testing equipment, and the like that utilize a digital single-lens reflex camera, a digital video camera, or a digital camera, and has a significant industrial value.

The invention claimed is:
1. A multifunctional polarizing filter that is attached to a front side of a lens of a digital camera that is used for testing equipment, measuring equipment and medical equipment and functions as a polarizing filter and an ultraviolet cut filter, the multifunctional polarizing filter comprising:
 a main body that includes an ultraviolet cut glass substrate that is positioned on a light-incident side, and a transmitting glass substrate that is positioned on a camera side, a surface of the ultraviolet cut glass substrate positioned on the light-incident side being polished, and coated with an antireflection coating, an ultraviolet cut thin film formed of a dielectric multilayer film being stacked on a surface of the ultraviolet cut glass substrate positioned on the camera side, a polarizing filter being bonded to a surface of the transmitting glass substrate positioned on the light-incident side through a first adhesive, a surface of the transmitting glass substrate positioned on the camera side being polished, and coated with an antireflection coating, and the ultraviolet cut glass substrate and the transmitting glass substrate being integrated through a second adhesive.

2. A multifunctional polarizing filter that is attached to a front side of a lens of a digital camera that is used for testing equipment, measuring equipment and medical equipment and functions as a polarizing filter and a near-infrared cut filter, the multifunctional polarizing filter comprising:

a main body that includes a near-infrared cut glass substrate that is positioned on a light-incident side, and a transmitting glass substrate that is positioned on a camera side, a surface of the near-infrared cut glass substrate positioned on the light-incident side being polished, and coated with an antireflection coating, a near-infrared cut thin film formed of a dielectric multilayer film being stacked on a surface of the near-infrared cut glass substrate positioned on the camera side, a polarizing filter being bonded to a surface of the transmitting glass substrate positioned on the light-incident side through a first adhesive, a surface of the transmitting glass substrate positioned on the camera side being polished, and coated with an antireflection coating, and the near-infrared cut glass substrate and the transmitting glass substrate being integrated through a second adhesive.

3. A multifunctional polarizing filter that is attached to a front side of a lens of a digital camera that is used for testing equipment, measuring equipment and medical equipment and functions as a polarizing filter and an ultraviolet/near-infrared cut filter, the multifunctional polarizing filter comprising:

a main body that includes an ultraviolet/near-infrared cut glass substrate that is positioned on a light-incident side, and a transmitting glass substrate that is positioned on a camera side, a surface of the ultraviolet/near-infrared cut glass substrate positioned on the light-incident side being polished, and coated with an antireflection coating, an ultraviolet/near-infrared cut thin film formed of a dielectric multilayer film being stacked on a surface of the ultraviolet/near-infrared cut glass substrate positioned on the camera side, a polarizing filter being bonded to a surface of the transmitting glass substrate positioned on the light-incident side through a first adhesive, a surface of the transmitting glass substrate positioned on the camera side being polished, and coated with an antireflection coating, and the ultraviolet/near-infrared cut glass substrate and the transmitting glass substrate being integrated through a second adhesive.

4. A method for producing a multifunctional polarizing filter that is attached to a front side of a lens of a digital camera that is used for testing equipment, measuring equipment and medical equipment and functions as a polarizing filter and an ultraviolet cut filter, a near-infrared cut filter, or an ultraviolet/near-infrared cut filter, the method comprising:

separately producing a glass substrate that is positioned on a light-incident side, and a transmitting glass substrate that is positioned on a camera side;

stacking a dielectric multilayer film that blocks ultraviolet rays, or blocks near-infrared rays, or blocks ultraviolet rays and near-infrared rays on a surface of the glass substrate positioned on the camera side by a high-temperature process such as sputtering or vacuum evaporation to obtain an ultraviolet cut filter, a near-infrared cut filter, or an ultraviolet/near-infrared cut filter;

bonding a polarizing filter to a surface of the transmitting glass substrate positioned on the light-incident side through a first adhesive;

integrating the glass substrate and the transmitting glass substrate through a second adhesive to obtain a multifunctional polarizing filter; and polishing each side of the multifunctional polarizing filter, and coating each side of the multifunctional polarizing filter with an antireflection coating.

* * * * *